United States Patent
Union

(10) Patent No.: US 7,582,136 B2
(45) Date of Patent: Sep. 1, 2009

(54) RECOVERY OF GOLD FROM POTASSIUM IODIDE-IODINE ETCHING SOLUTION

(75) Inventor: Robert E. Union, Westford, MA (US)

(73) Assignee: Union Etchants International, Inc., Woburn, MA (US)

( * ) Notice: Subject to any disclaimer, the term of this patent is extended or adjusted under 35 U.S.C. 154(b) by 159 days.

(21) Appl. No.: 11/692,646

(22) Filed: Mar. 28, 2007

(65) Prior Publication Data

US 2007/0217976 A1    Sep. 20, 2007

Related U.S. Application Data

(63) Continuation of application No. PCT/US2005/035003, filed on Sep. 28, 2005.

(60) Provisional application No. 60/613,667, filed on Sep. 28, 2004.

(51) Int. Cl.
*C22B 3/20* (2006.01)
*C22B 3/44* (2006.01)

(52) U.S. Cl. .............. 75/721; 75/739; 75/740; 75/741; 423/44; 423/22

(58) Field of Classification Search .......... 75/739; 423/42
See application file for complete search history.

(56) References Cited

U.S. PATENT DOCUMENTS

| | | | |
|---|---|---|---|
| 3,957,505 A * | 5/1976 | Homick et al. ............ 75/720 |
| 4,072,605 A | 2/1978 | Thelander | |
| 4,078,918 A * | 3/1978 | Perman ..................... 75/713 |
| 4,131,454 A | 12/1978 | Piret et al. | |
| 4,319,922 A | 3/1982 | Macdonald | |
| 4,319,923 A | 3/1982 | Falanga et al. | |
| 4,375,984 A | 3/1983 | Bahl et al. | |
| 4,859,293 A | 8/1989 | Hirako et al. | |
| 5,137,700 A | 8/1992 | Sloan | |
| 5,169,503 A | 12/1992 | Baughman et al. | |
| 5,419,834 A * | 5/1995 | Straten ................ 210/198.1 |
| 5,542,957 A | 8/1996 | Han et al. | |

FOREIGN PATENT DOCUMENTS

EP     363552 A1 *  4/1990
RU    2235796 C1    9/2004

OTHER PUBLICATIONS

International Search Report and Written Opinion dated Jan. 5, 2006 issued in the corresponding International Patent Application No. PCT/US05/35003 filed on Sep. 28, 2005. 8 pgs.
The Gold Hunter Test Kit. "You Can Actually Test And Recover Gold With This Kit". www.thegoldhunter.net. 2253S 1400E, Gooding, ID 83330. Internet printout. 9 pgs.

* cited by examiner

*Primary Examiner*—George Wyszomierski
*Assistant Examiner*—Tima M McGuthry-Banks
(74) *Attorney, Agent, or Firm*—Grossman, Tucker, Perreault & Pfleger, PLLC

(57) ABSTRACT

A process for the recovery of gold from a potassium iodide-iodine solution is provided. The gold is precipitated from the solution using a weak acid, (e.g. ascorbic acid), a buffer, (e.g. sodium bicarbonate), and a dye. The precipitate is then removed from the solution resulting in the recovery the gold precipitate and the potassium iodide-iodine solution.

5 Claims, 2 Drawing Sheets

RECOVERY OF GOLD FROM POTASSIUM IODIDE-IODINE ETCHING SOLUTION

CROSS REFERENCE TO RELATED APPLICATIONS

This application is a continuation of International Application No. PCT/US2005/35003 filed Sep. 28, 2005 and published Apr. 6, 2006 as International Publication No. WO 2006/037097, designating the United States, and which claims benefit of U.S. Provisional Application No. 60/613,667 filed Sep. 28, 2004, the teachings of which are incorporated herein by reference.

FIELD OF INVENTION

The present invention relates generally to the recovery of precious metal, and more particularly the recovery of gold from iodide-iodine etching solutions. Specifically, a method for the recovery of gold from a potassium iodide-iodine etching solution is disclosed in which the gold is precipitated from the iodide-iodine solution through the addition of a weak acid and a buffer.

BACKGROUND

Iodide-iodine etching solutions have been employed to recover precious metals from ore and scrap materials and have since been employed in the electronic and jewelry making industries in the etching and stripping of precious metals. Use of iodide-iodine solutions avoid toxicity problems associated with the previously used cyanide etching solutions but are considered costly.

Methods to reclaim spent iodide-iodine etching solutions have been developed to decrease the costs associated with their use. U.S. Pat. No. 3,957,505 discloses a process that dissolves and precipitates gold in potassium iodide-iodine using a reducing agent and a buffer. The solution can then be regenerated through the use of an oxidizing agent. U.S. Pat. No. 5,137,700 discloses the use of a hydroidic acid and iodine solution or ammonium iodide and iodine solution for the recovery of precious metals. A reducing agent is added to the solution with a buffer and the precious metal is precipitated from the solution. The spent solution is then treated to either oxidize it to its original state or to precipitate out the elemental iodine which is then used to supply the components for a new etching solution.

SUMMARY

According to one aspect, the present invention provides a method for the reclamation of an etchant solution using materials that are environmentally and economically friendly. The process may include the use of an iodine-iodide solution and a weak acid to precipitate precious metal from the solution in combination with a buffer.

According to another aspect, the present invention employs an etchant solution consisting of iodide-iodine and more specifically potassium iodide-iodine.

According to another aspect, the present invention employs an acid with a pH within the range of greater than about 2.0. Preferably, the pH of the acid is within the range of 2.0-7.0 and all incremental values within such ranges, e.g. 2.1, 2.2, 2.3, etc. Therefore the invention is directed at acids which provide a pH of about 2.0-3.0, or 2.0-4.0, or 2.0-5.0, etc. A particularly preferred acid includes but is not limited to ascorbic acid.

According to another aspect, the present invention precipitates gold from the etchant solution.

According to another aspect, the present invention employs sodium bicarbonate or similar materials as a buffer.

According to another aspect, the present invention includes the addition of a dye in combination with weak acid and buffer.

According to another aspect, the present invention includes the removal of precipitated precious metal from the solution and more specifically through the decanting process.

BRIEF DESCRIPTION OF THE DRAWINGS

Features and advantages of the present invention are set forth herein by description of embodiments consistent with the present invention, which description should be considered in conjunction with the accompanying drawings, wherein.

DETAILED DESCRIPTION OF THE PREFERRED EMBODIMENTS

The present invention is a process for the reclamation of an etchant solution through the precipitation of precious metal by the addition of weak acid and a buffer. A dye may also be used in the solution. Precious metals include gold and other metals that may be suitable for etching.

Figure 1:
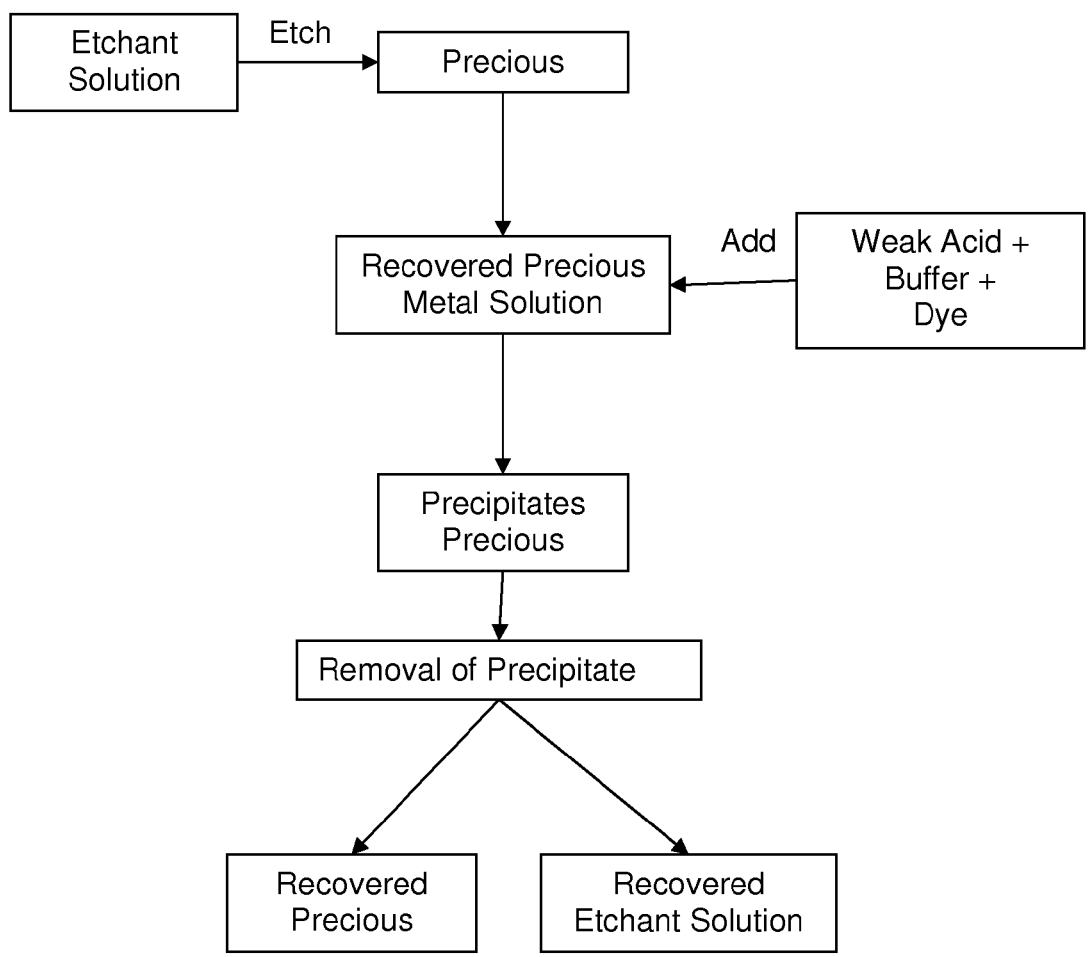
FIG. 1. is a flow diagram of the precious metal recovery process.

Turning to FIG. 1, an etchant solution 10 is used to etch a precious metal 20. The etchant solution containing the precious metal is recovered 30. To the recovered etchant solution 30 is added weak acid, a buffer and a dye 40. This causes the precipitation of precious metal 50. The precipitate is removed 60 and the precious metal 70 and etchant solution 80 are recovered.

Figure 2:
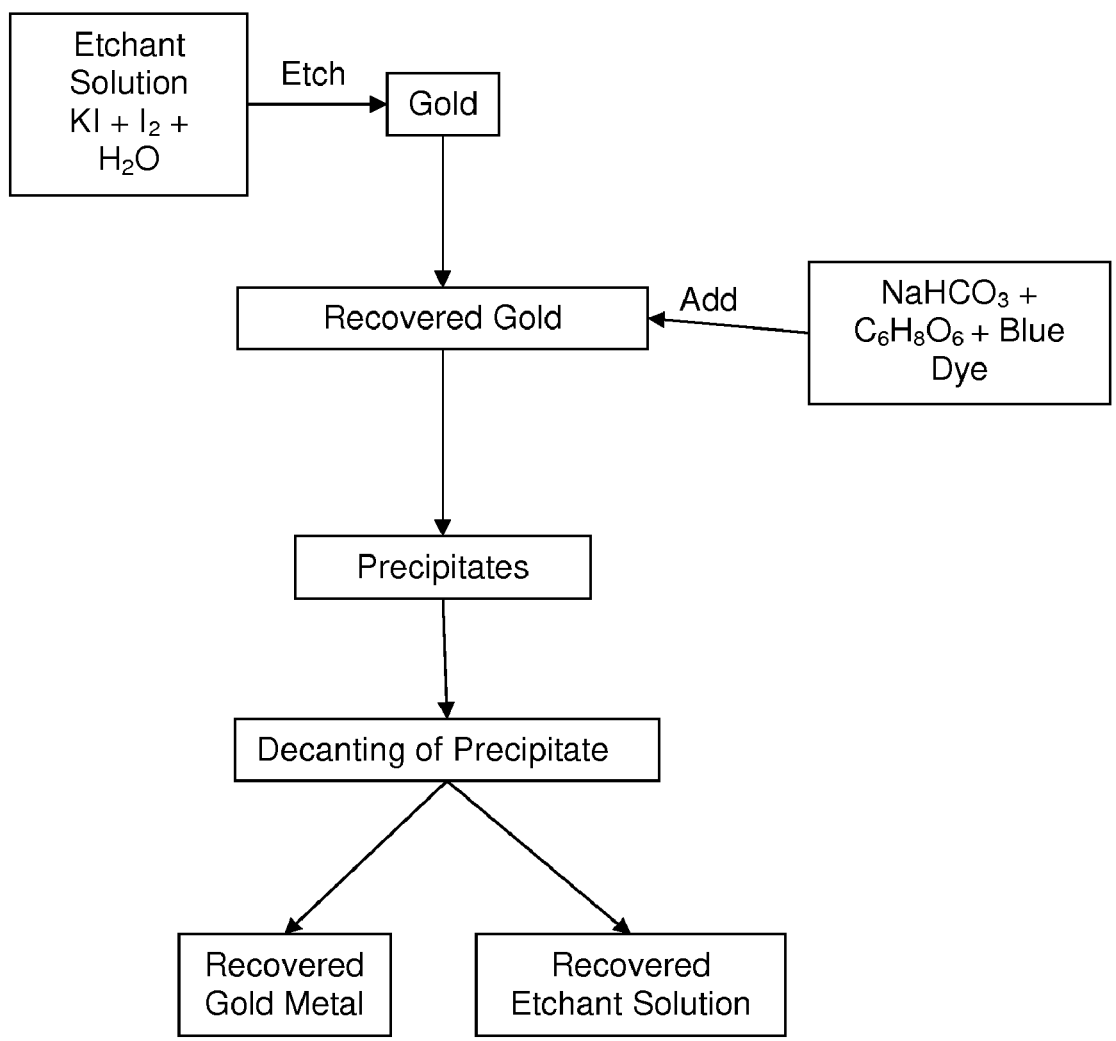
FIG. 2. is a flow diagram of the precious metal recovery process to recover gold from a potassium iodide-iodine solution using ascorbic acid and sodium bicarbonate in combination with a blue die to precipitate gold which is then decanted.

Turning to FIG. 2, a potassium iodide-iodine solution 10 is used to etch gold 20. The etchant solution containing the gold is recovered 30. To the recovered etchant solution 30 is added ascorbic acid, sodium bicarbonate and a blue dye 40. This causes the gold to precipitate 50. The precipitate is removed by the decanting process 60 and the gold 70 and etchant solution 80 are recovered.

The foregoing description is provided to illustrate and explain the present invention. However, the description hereinabove should not be considered to limit the scope of the invention set forth in the claims appended here to.

What is claimed is:

1. A process to recover a precious metal from an etching solution comprising:
   providing a iodine-iodide solution wherein said iodine-iodide solution contains a precious metal;
   providing an acid including ascorbic acid and a buffer and treating said iodine-iodide solution with said acid and said buffer; and
   precipitating said precious metal from said iodine-iodide solution to form a precipitate.

2. The process according to claim 1 wherein said precipitate from said iodine-iodide solution is removed.

3. The process of claim 1 wherein the precious metal is gold.

4. The process of claim 1 wherein said buffer consists of sodium bicarbonate.

5. The process of claim 1, further comprising providing a dye.

* * * * *